US011425921B2

(12) United States Patent
Chien et al.

(10) Patent No.: US 11,425,921 B2
(45) Date of Patent: Aug. 30, 2022

(54) DRIED FOOD FRESH-KEEPING PACKAGING BAG STRUCTURE

(71) Applicants: Tsung-Ping Chien, Taichung (TW); Yi-An Chien, Taichung (TW)

(72) Inventors: Tsung-Ping Chien, Taichung (TW); Yi-An Chien, Taichung (TW)

(73) Assignee: ChuanPen International Packing CO., LTD., Taichung (TW)

( * ) Notice: Subject to any disclaimer, the term of this patent is extended or adjusted under 35 U.S.C. 154(b) by 804 days.

(21) Appl. No.: 16/388,849

(22) Filed: Apr. 18, 2019

(65) Prior Publication Data

US 2019/0239543 A1 Aug. 8, 2019

(30) Foreign Application Priority Data

Sep. 25, 2018 (TW) .................................. 107133602

(51) Int. Cl.
| | |
|---|---|
| *A23L 3/3598* | (2006.01) |
| *B65D 33/25* | (2006.01) |
| *B65D 81/26* | (2006.01) |
| *A23L 3/3427* | (2006.01) |
| *B65D 81/28* | (2006.01) |

(52) U.S. Cl.
CPC ........... *A23L 3/3598* (2013.01); *A23L 3/3427* (2013.01); *B65D 33/25* (2013.01); *B65D 81/266* (2013.01); *B65D 81/28* (2013.01); *B65D 81/268* (2013.01)

(58) Field of Classification Search
CPC ........ F28B 21/083; F28B 9/003; F28B 9/006; B65D 81/268; B65D 81/266; B65D 51/30; B65D 25/08; A24F 25/02

USPC ...................................... 206/204, 222, 524.4
See application file for complete search history.

(56) References Cited

U.S. PATENT DOCUMENTS

| | | | | |
|---|---|---|---|---|
| 2,446,361 | A * | 8/1948 | Clibbon | B65D 81/268 206/0.5 |
| 3,680,689 | A * | 8/1972 | Grundschober | B65D 81/3266 220/279 |
| 5,428,346 | A * | 6/1995 | Franklin | B65D 81/264 206/204 |
| 5,698,217 | A * | 12/1997 | Wilking | A61K 9/703 206/440 |
| 5,813,564 | A * | 9/1998 | Luo | B65D 81/268 206/204 |
| 5,934,773 | A * | 8/1999 | Ferrell | A24F 25/02 206/204 |

(Continued)

FOREIGN PATENT DOCUMENTS

GB 2376220 A * 12/2002 ............. B65D 25/08

*Primary Examiner* — Chun Hoi Cheung (57) ABSTRACT

A dried food fresh-keeping packaging bag structure includes a packaging bag and a fresh-keeping device in the packaging bag. The fresh-keeping device includes a storage box. One side of the storage box is attached to an inner surface of the packaging bag. The storage box has a storage chamber filled with a preservative. One side of the storage chamber is formed with an outlet provided with a breathable film to block the preservative. An outside of the breathable film is provided with a sealing film to seal the storage chamber. One end of the sealing film extends to an outside of a mouth of the packaging bag to form a pull portion. When in use, the pull portion is pulled to tear the sealing film from the fresh-keeping device, so that the dried food product in the packaging bag is kept dry by the preservative.

9 Claims, 9 Drawing Sheets

(56) References Cited

U.S. PATENT DOCUMENTS

| | | | | |
|---|---|---|---|---|
| 6,719,130 | B1* | 4/2004 | Wagner | B65D 1/04 |
| | | | | 215/6 |
| 7,387,205 | B1* | 6/2008 | Wilson | B65D 81/268 |
| | | | | 206/524.4 |
| 7,591,369 | B2* | 9/2009 | Lin | A63B 47/00 |
| | | | | 239/57 |
| 2009/0145783 | A1* | 6/2009 | Forker | B65D 81/268 |
| | | | | 206/204 |
| 2011/0091614 | A1* | 4/2011 | Malone | B65D 81/3211 |
| | | | | 426/115 |
| 2013/0098783 | A1* | 4/2013 | Hernandez | F26B 21/083 |
| | | | | 206/204 |
| 2015/0175313 | A1* | 6/2015 | Amemiya | B65D 33/01 |
| | | | | 383/100 |
| 2021/0016944 | A1* | 1/2021 | Machado | B65D 81/28 |

* cited by examiner

DRIED FOOD FRESH-KEEPING PACKAGING BAG STRUCTURE

FIELD OF THE INVENTION

The present invention relates to a dried food fresh-keeping packaging bag structure. When the user wants to have the dried food product in the packaging bag and keep the dried food product dry, a pull portion is pulled to tear a sealing film from a fresh-keeping device, so that the dried food product in the packaging bag is kept dry by a preservative, thereby improving convenience and food preservation.

BACKGROUND OF THE INVENTION

Dried food products, such as tea, coffee, biscuits, snacks and the like, are always packed in bags. The food in the bag is generally put together with a preservative, such as a desiccant/deoxidizer, to reduce, lower or prevent the food from being damped, oxidized or deteriorated. In general, the desiccant/deoxidizer is packed in a breathable bag and then placed in the packaging bag. If the outside of the packaging bag is squeezed by improper external force, the desiccant bag/deoxidizer bag may be damaged or broken, to contaminate the food in the packaging bag or to cause inadvertent incidents due to temporary negligence or identification that children do not understand, which will affect the safety of the food fresh-keeping packaging.

In view of this, the conventional dried food packaging bag needs to be improved, and its safety and convenience still need to be improved. Accordingly, the inventor of the present invention has devoted himself based on his many years of practical experiences to solve these problems and develop a dried food fresh-keeping packaging bag structure.

SUMMARY OF THE INVENTION

The primary object of the present invention is to provide a dried food fresh-keeping packaging bag structure, comprising a packaging bag and a fresh-keeping device disposed in the packaging bag. The fresh-keeping device includes a storage box made of a compression-resistant material. One side of the storage box is attached to an inner surface of the packaging bag. The storage box has a storage chamber therein. The storage chamber is filled with a preservative. One side of the storage chamber is formed with an outlet. The outlet is provided with a breathable film to block the preservative from leaking. An outside of the breathable film is provided with a sealing film to seal the storage chamber. One end of the sealing film extends to an outside of a mouth of the packaging bag to form a pull portion.

The breathable film and the sealing film are attached to the outlet of the storage chamber in sequence. The outlet is located at another opposite side of the storage box attached to the packaging bag. When the packaging bag is used for packing a dried food product, the mouth of the packaging bag is opened, and the pull portion is pulled outwardly toward the mouth of the packaging bag to tear the sealing film from the outlet of the storage box. After the dried food product is placed into the packaging bag, the mouth of the packaging bag is closed, and the preservative inside the storage chamber communicates with an inner space of the packaging bag to bring a fresh-keeping effect.

The breathable film and the sealing film of the storage box are attached to one side of the outlet of the storage chamber in sequence. The side of the storage box is formed with a flange attached to the packaging bag. The sealing film has one side attached to the flange and another side attached to the inner surface of the packaging bag. At least one cut line is formed at a joint between the sealing film and the pull portion. When an outside of the outlet of the packaging bag is pulled by the pull portion, the cut line is broken to form a notch on the sealing film, so that the preservative in the storage chamber communicates with an inner space of the packaging bag via the notch, thereby providing a fresh-keeping effect for a dried food product in the packaging bag.

The dried food fresh-keeping packaging bag structure of the present invention has an innovative and unique design. When the user wants to have the dried food product in the packaging bag and keep the dried food product dry, the pull portion is pulled to tear the sealing film from the fresh-keeping device, so that the dried food product in the packaging bag is kept dry by the preservative, thereby improving convenience and food preservation.

DETAILED DESCRIPTION OF THE PREFERRED EMBODIMENTS

Embodiments of the present invention will now be described, by way of example only, with reference to the accompanying drawings.

Figure 1:
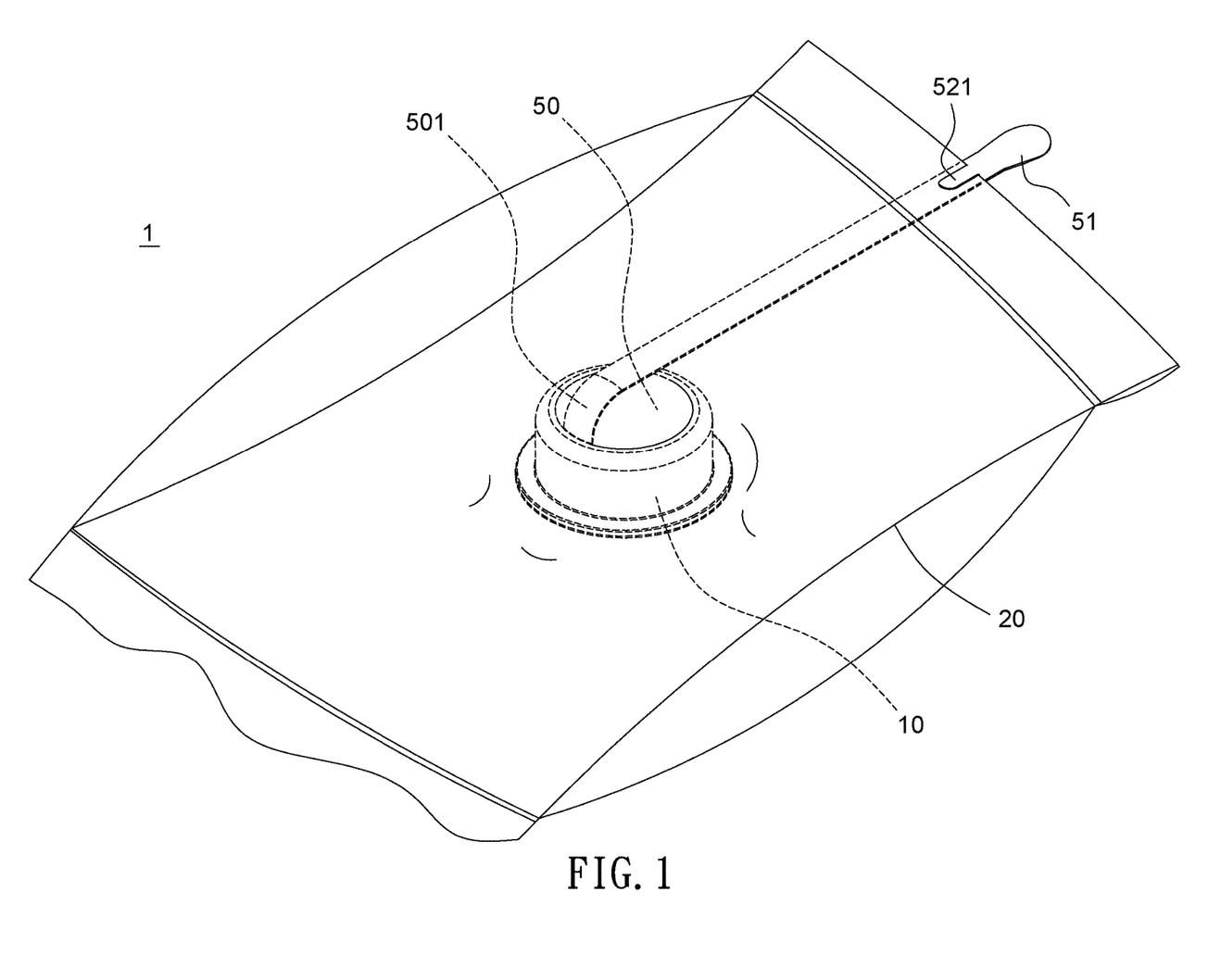
FIG. 1 is a perspective view in accordance with a first embodiment of the present invention.
Figure 2:
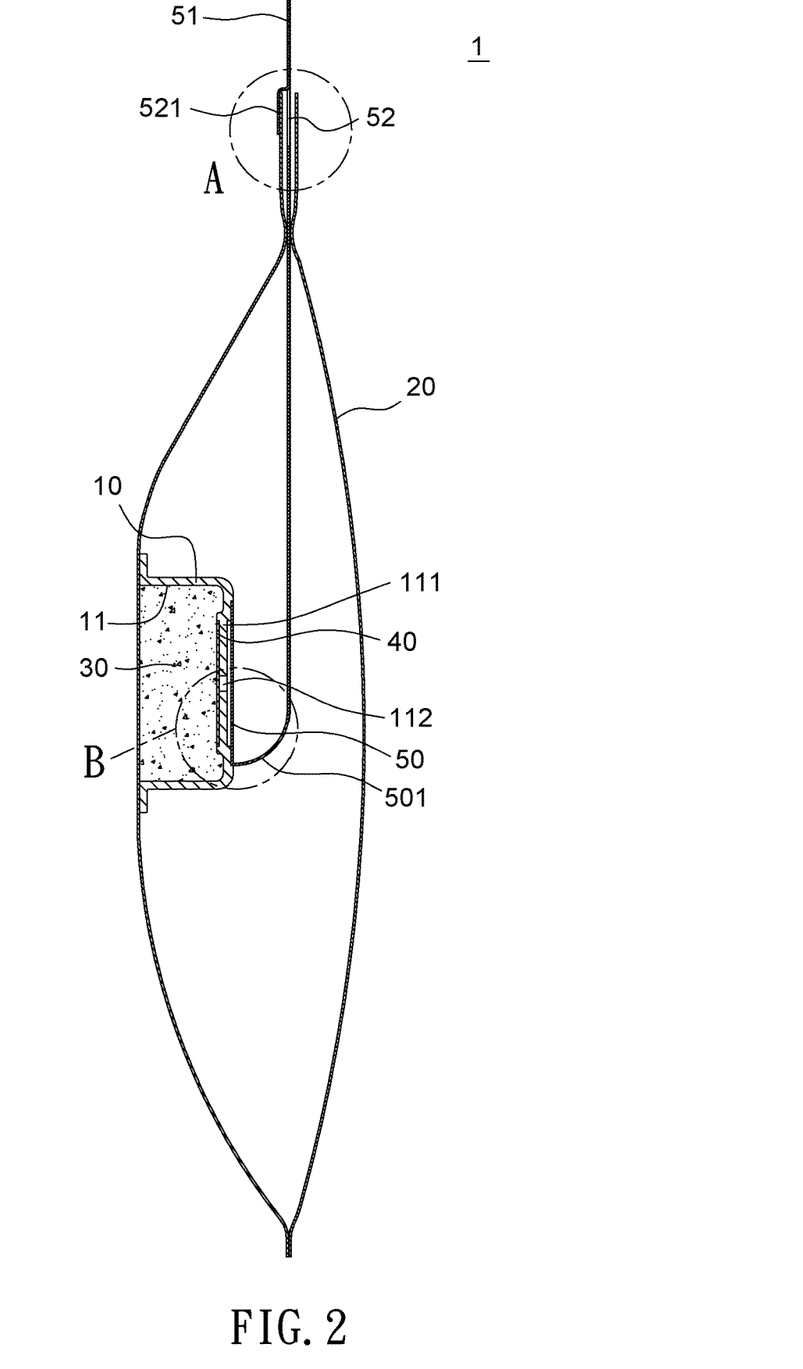
FIG. 2 is a cross-sectional view in accordance with the first embodiment of the present invention.
Figure 3:
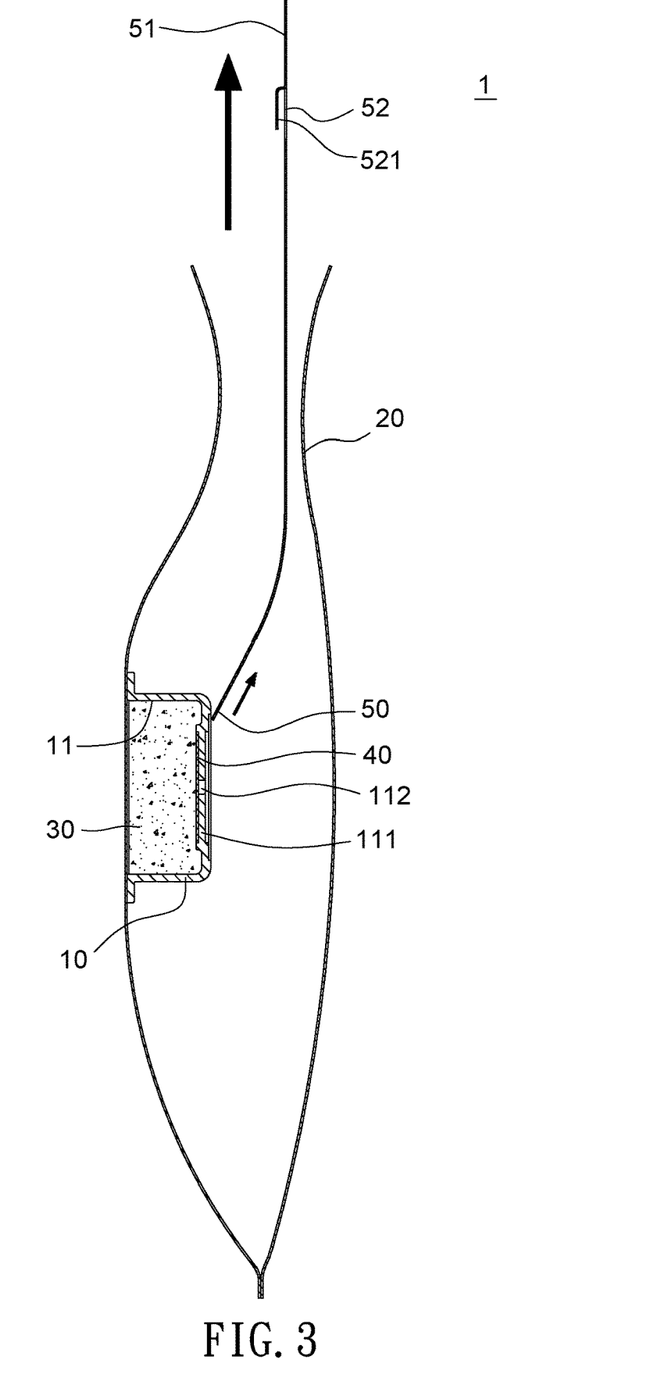
FIG. 3 is a schematic view in accordance with the first embodiment of the present invention when in use.

As shown in FIG. 1 through FIG. 3, a dried food fresh-keeping packaging bag structure in accordance with a preferred embodiment of the present invention comprises a packaging bag 20 and a fresh-keeping device 1 disposed in the packaging bag 20. The fresh-keeping device 1 includes a storage box 10 made of a compression-resistant material. One side of the storage box 10 is attached to the inner surface of the packaging bag 20. The storage box 10 has a storage chamber 11 therein. The storage chamber 11 is filled with a preservative 30. One side of the storage chamber 11 is formed with an outlet 12. The outlet 12 is provided with a breathable film 40 to block the preservative 30 from leaking. The outside of the breathable film 40 is provided with a sealing film 50 to seal the storage chamber 11. One end of the sealing film 50 extends to the outside of a mouth of the packaging bag 20 to form a pull portion 51.

Figure 2A:
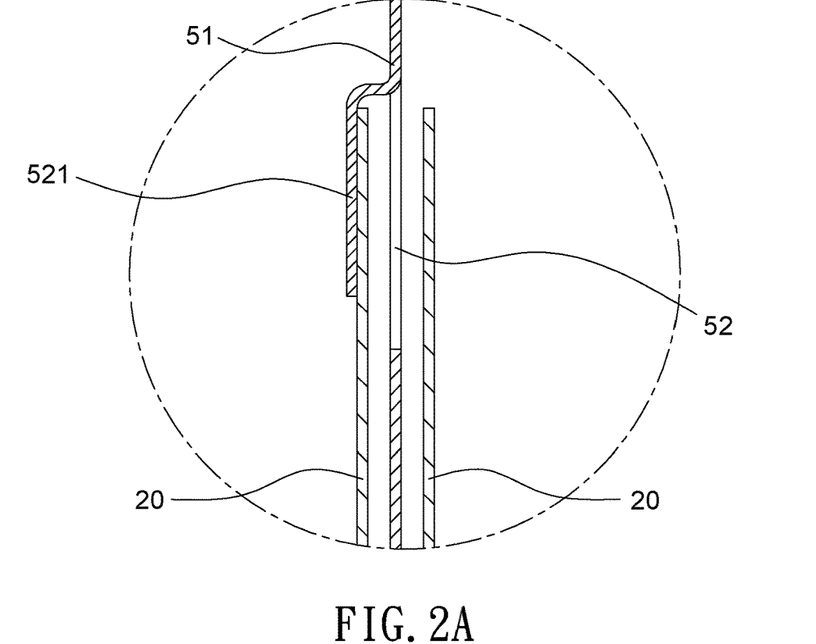
FIG. 2A is a partial enlarged view of circle A of FIG. 2.
Figure 2B:
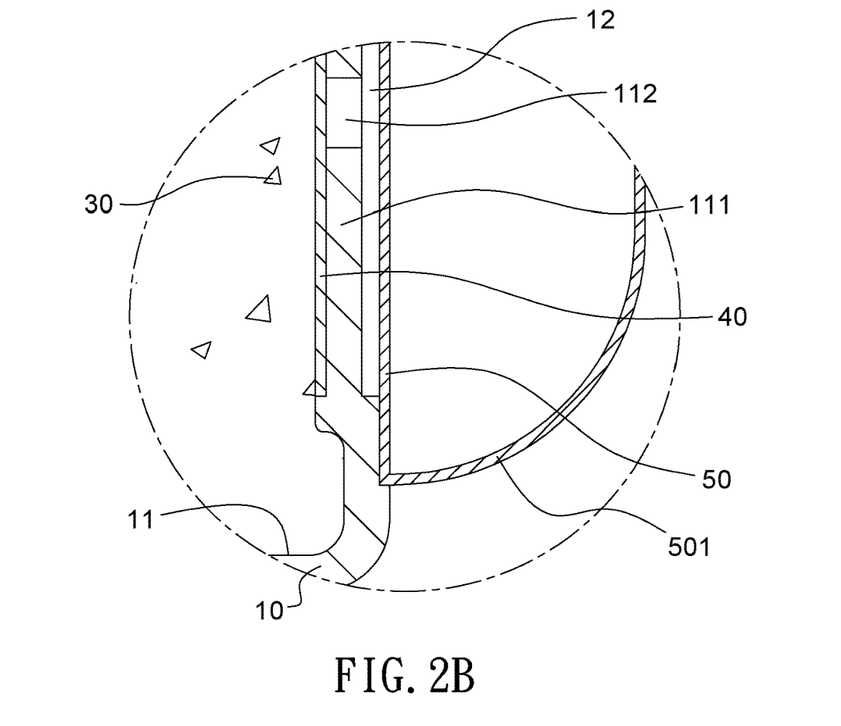
FIG. 2B is a partial enlarged view of circle B of FIG. 2.

Furthermore, referring to FIG. 2 to FIG. 2B and FIG. 1, an interlayer 111 is provided between the outlet 12 and the storage chamber 11. The interlayer 111 has at least one perforation 112 communicating with the outlet 12 and the storage chamber 11. The breathable film 40 is attached to one side of the interlayer 111.

The pull portion 51 is provided with a U-shaped or V-shaped clip slit 52 to form a clip piece 521. The pull portion 51 is clipped to the mouth of the packaging bag 20 through the clip piece 521, so that the pull portion 51 is held on the outside of the mouth of the packaging bag 20.

One end of the sealing film 50 has a bent portion 501 that is bent by 180 degrees and extends to the outside of the mouth of the packaging bag 20 to form the pull portion 51. The bent portion 501 is bent reversely from the inner edge of the sealing film 50 toward the mouth of the packaging bag 20, which enables the user to pull the pull portion 51 to provide the force that the sealing film 50 is torn apart from the storage box 10.

Figure 4:
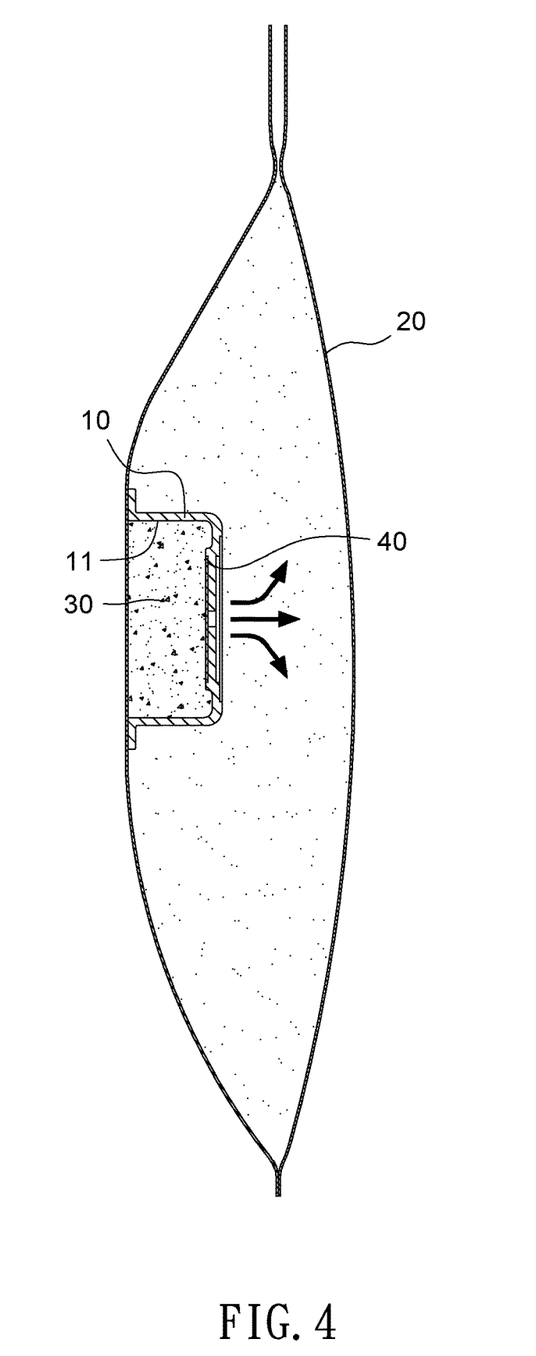
FIG. 4 is a schematic view of the present invention used for keeping the food packed in the packaging bag dry.
Figure 5:
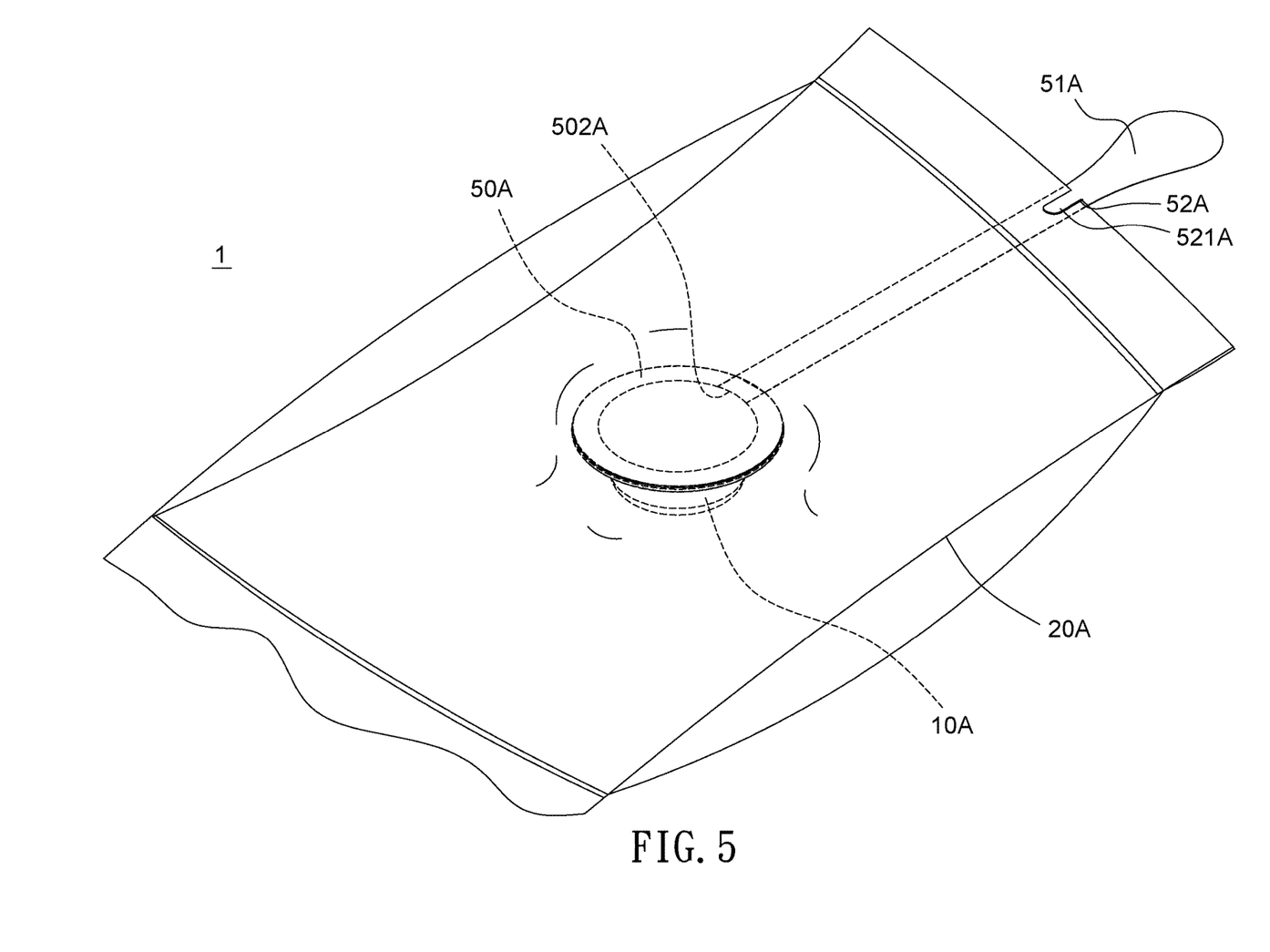
FIG. 5 is a perspective view in accordance with a second embodiment of the present invention.
Figure 6:
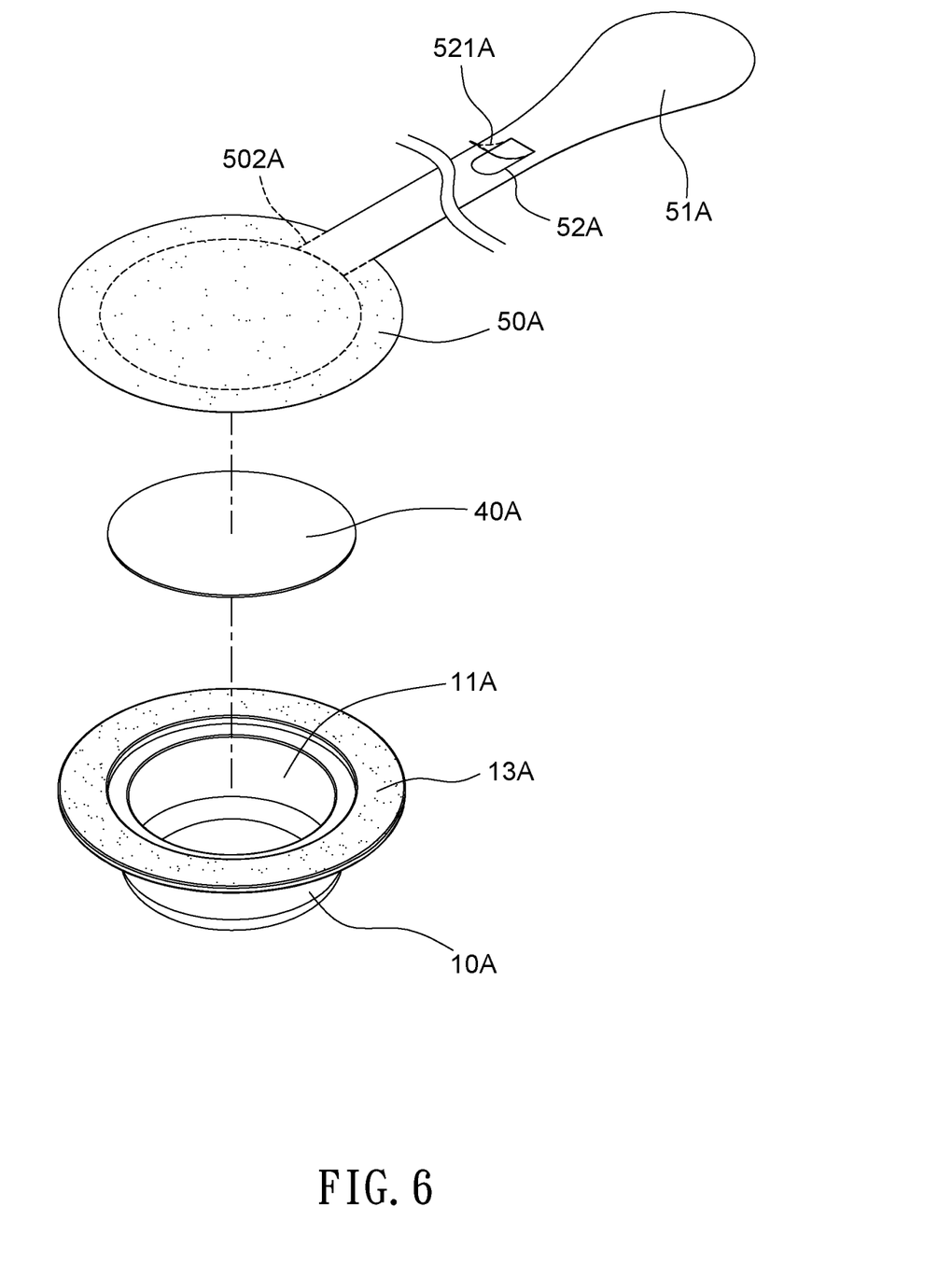
FIG. 6 is an exploded view in accordance with the second embodiment of the present invention.

In detail, referring to FIG. 3 and FIG. 4, the breathable film 40 and the sealing film 50 are attached to the outlet 12 of the storage chamber 11 in sequence. The outlet 12 is located at another opposite side of the storage box 10 attached to the packaging bag 20. When the packaging bag 20 is used for packing a dried food product, the mouth of the packaging bag 20 is opened, and the pull portion 51 is pulled outwardly toward the mouth of the packaging bag 20 to tear the sealing film 50 from the outlet 12 of the storage box 10. Then, the dried food product is placed into the packaging bag 20. When the mouth of the packaging bag 20 is closed, the preservative 30 inside the storage chamber 11 communicates with the inner space of the packaging bag 20 to produce a fresh-keeping effect.

FIGS. 5-7B illustrate a second embodiment of the present invention. The breathable film 40A and the sealing film 50A of the storage box 10A are attached to one side of the outlet 12A of the storage chamber 11A in sequence. The storage box 10A is attached to the package 20A at the outlet 12A. One side of the storage box 10A is formed with a flange 13A attached to the packaging bag 20A. The sealing film 50A has two sides, one side is attached to the flange 13A, and the other side is attached to the inner surface of the packaging bag 20A. At least one cut line 502A is formed at a joint between the sealing film 50A and the pull portion 51A.

Figure 7:
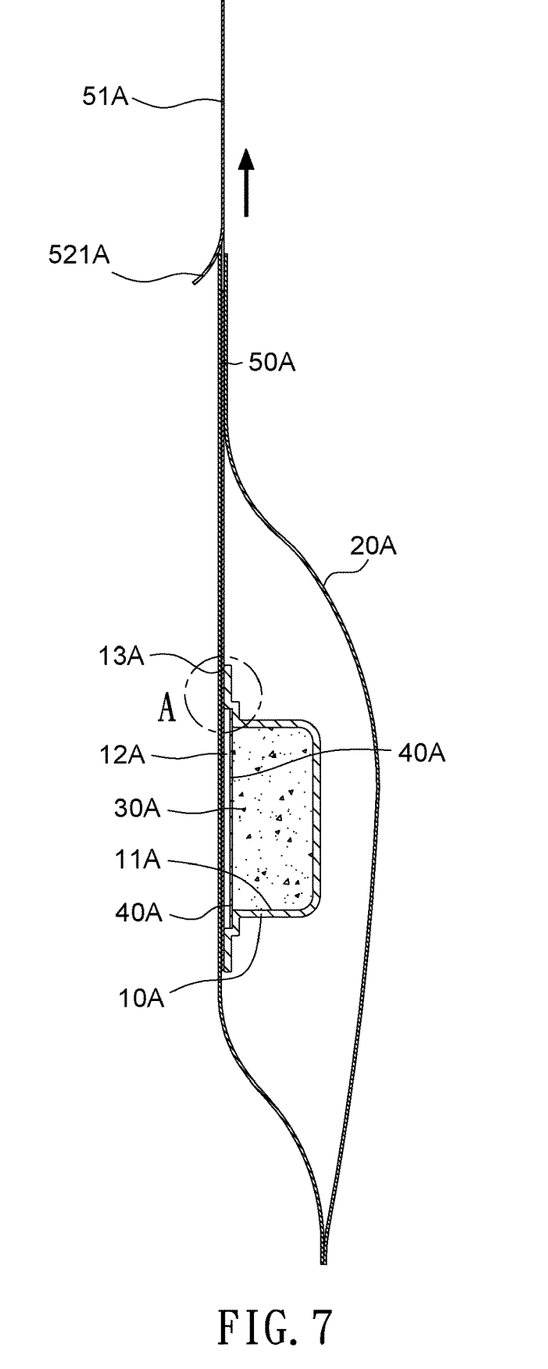
FIG. 7 is a schematic view in accordance with the second embodiment of the present invention when in use.
Figure 7A:
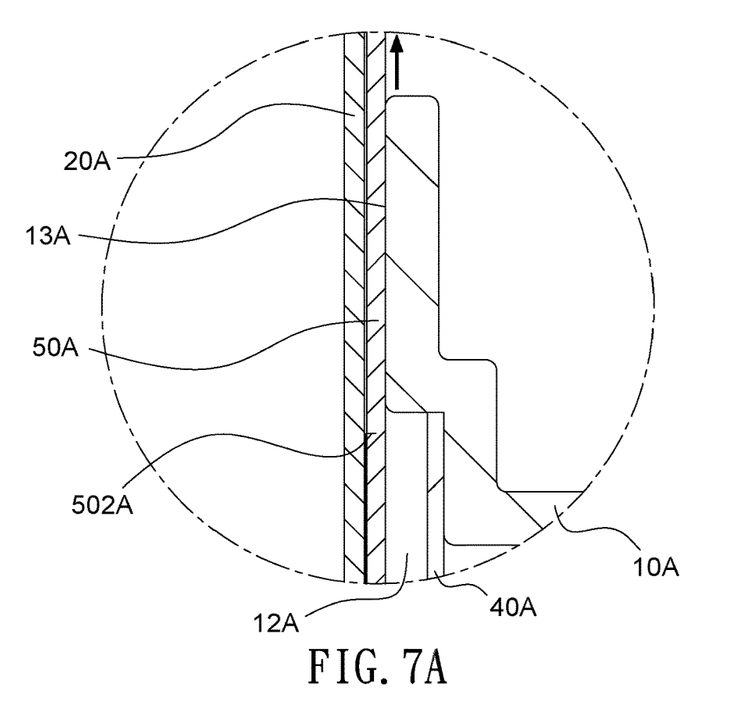
FIG. 7A is a partial enlarged view of circle A of FIG. 7.
Figure 7B:
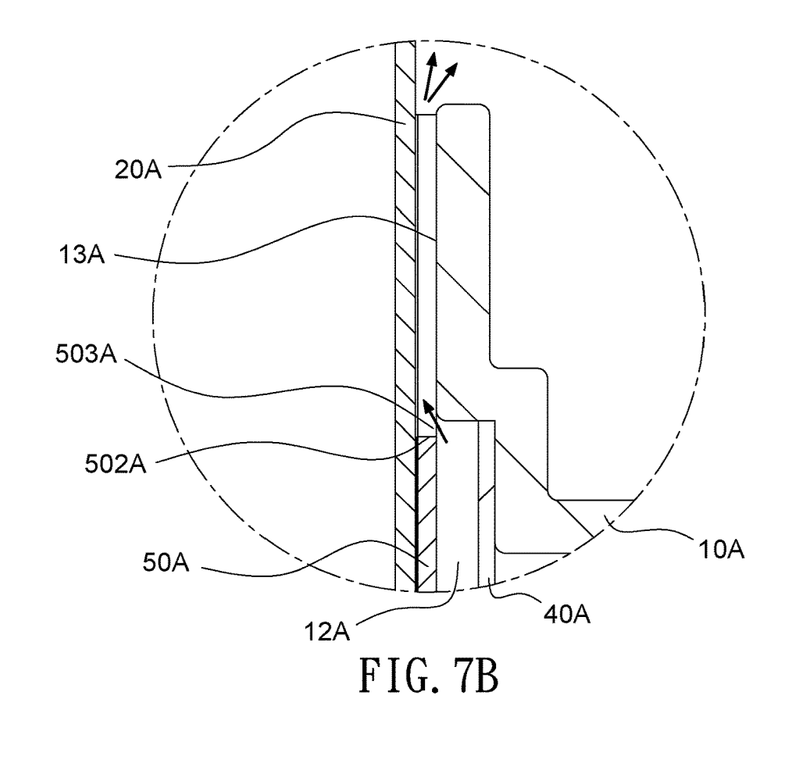
FIG. 7B is a partial enlarged view of circle B of FIG. 7.

When the outside of the outlet 12A of the packaging bag 20A is pulled by the pull portion 51A, the cut line 502A is broken to form a notch 503A on the sealing film 50A, so that the preservative 30A in the storage chamber 11A can communicate with the inner space of the packaging bag 20A via the notch 503A, thereby providing a fresh-keeping effect for the food in the sealed packaging bag 20A.

The pull portion 51A is provided with a U-shaped or V-shaped clip slit 52A to form a clip piece 521A. The pull portion 51A is clipped to the mouth of the packaging bag 20A through the clip piece 521A, so that the pull portion 51A is held on the outside of the mouth of the packaging bag 20A.

The packaging bag 20, 20A may be changed according to actual needs. The packaging bag 20, 20A is a zipper bag, or the packaging bag 20, 20A is a heat seal bag sealed by a heat sealer.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A dried food fresh-keeping packaging bag structure, comprising a packaging bag and a fresh-keeping device disposed in the packaging bag, the fresh-keeping device including a storage box made of a compression-resistant material, one side of the storage box being attached to an inner surface of the packaging bag, the storage box having a storage chamber therein, the storage chamber being filled with a preservative, one side of the storage chamber being formed with an outlet, the outlet being provided with a breathable film to block the preservative from leaking, an outside of the breathable film being provided with a sealing film to seal the storage chamber, one end of the sealing film extending to an outside of a mouth of the packaging bag to form a pull portion.

2. The dried food fresh-keeping packaging bag structure as claimed in claim 1, wherein the breathable film and the sealing film are attached to the outlet of the storage chamber in sequence, the outlet is located at another opposite side of the storage box attached to the packaging bag, when the packaging bag is used for packing a dried food product, the mouth of the packaging bag is opened, and the pull portion is pulled outwardly toward the mouth of the packaging bag to tear the sealing film from the outlet of the storage box, after the dried food product is placed into the packaging bag, the mouth of the packaging bag is closed, and the preservative inside the storage chamber communicates with an inner space of the packaging bag to bring a fresh-keeping effect.

3. The dried food fresh-keeping packaging bag structure as claimed in claim 2, wherein an interlayer is provided between the outlet and the storage chamber, the interlayer has at least one perforation communicating with the outlet and the storage chamber, and the breathable film is attached to one side of the interlayer.

4. The dried food fresh-keeping packaging bag structure as claimed in claim 2, wherein the pull portion is provided with a U-shaped or V-shaped clip slit to form a clip piece, the pull portion is clipped to the mouth of the packaging bag through the clip piece, so that the pull portion is held on the outside of the mouth of the packaging bag.

5. The dried food fresh-keeping packaging bag structure as claimed in claim 2, wherein the end of the sealing film has a bent portion that is bent by 180 degrees and extends to the outside of the mouth of the packaging bag to form the pull portion, and the bent portion is bent reversely from an inner edge of the sealing film toward the mouth of the packaging bag.

6. The dried food fresh-keeping packaging bag structure as claimed in claim 1, wherein the breathable film and the sealing film of the storage box are attached to one side of the outlet of the storage chamber in sequence, the side of the storage box is formed with a flange attached to the packaging bag, the sealing film has one side attached to the flange and another side attached to the inner surface of the packaging bag, at least one cut line is formed at a joint between the sealing film and the pull portion; when an outside of the outlet of the packaging bag is pulled by the pull portion, the cut line is broken to form a notch on the sealing film, so that the preservative in the storage chamber communicates with an inner space of the packaging bag via the notch, thereby providing a fresh-keeping effect for a dried food product in the packaging bag.

7. The dried food fresh-keeping packaging bag structure as claimed in claim 6, wherein the pull portion is provided with a U-shaped or V-shaped clip slit to form a clip piece, the pull portion is clipped to the mouth of the packaging bag through the clip piece, so that the pull portion is held on the outside of the mouth of the packaging bag.

8. The dried food fresh-keeping packaging bag structure as claimed in claim 1, wherein the packaging bag is a zipper bag.

9. The dried food fresh-keeping packaging bag structure as claimed in claim 1, wherein the packaging bag is a heat seal bag sealed by a heat sealer.

* * * * *